(12) United States Patent
Uffenkamp

(10) Patent No.: US 11,473,906 B2
(45) Date of Patent: Oct. 18, 2022

(54) METHOD AND DEVICE FOR ALIGNING A CALIBRATION DEVICE

(71) Applicant: Robert Bosch GmbH, Stuttgart (DE)

(72) Inventor: Volker Uffenkamp, Ludwigsburg (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 17/273,981

(22) PCT Filed: Aug. 9, 2019

(86) PCT No.: PCT/EP2019/071443
§ 371 (c)(1),
(2) Date: Mar. 5, 2021

(87) PCT Pub. No.: WO2020/052877
PCT Pub. Date: Mar. 19, 2020

(65) Prior Publication Data
US 2021/0356262 A1    Nov. 18, 2021

(30) Foreign Application Priority Data

Sep. 11, 2018  (DE) .......................... 102018215417.1
Sep. 26, 2018  (DE) .......................... 102018216451.7

(51) Int. Cl.
*G01B 11/27*  (2006.01)
*G06T 7/80*   (2017.01)
(Continued)

(52) U.S. Cl.
CPC .......... *G01B 11/272* (2013.01); *G01S 7/4972* (2013.01); *G01S 17/08* (2013.01);
(Continued)

(58) Field of Classification Search
CPC .................. G01B 11/272; G06T 7/80; G06T 2207/30252; G01S 7/4972; G01S 17/08; H04N 17/002
See application file for complete search history.

(56) References Cited

U.S. PATENT DOCUMENTS

2004/0133376 A1* 7/2004 Uffenkamp ............... G06T 7/80
                                                      702/104
2005/0216146 A1* 9/2005 Bauer ..................... B60T 8/172
                                                      701/41
(Continued)

FOREIGN PATENT DOCUMENTS

DE       19941034 A1    3/2001
EP       1953518 A2     8/2008
(Continued)

OTHER PUBLICATIONS

International Search Report for PCT/EP2019/071443, dated Nov. 27, 2019.

*Primary Examiner* — Zaihan Jiang
(74) *Attorney, Agent, or Firm* — Norton Rose Fulbright US LLP; Gerard Messina

(57) ABSTRACT

A method for aligning a calibration device for calibrating a vehicle environmental sensor of a vehicle, and a device for carrying out such a method. The method includes: measuring a temporal curve of at least one measurement point using the camera, determining the geometrical driving axis from the temporal curve of the at least one measurement point, measuring a first and a second lateral distance value of the vehicle using the distance sensors at a measurement time, determining a center of a vehicle axle at the measurement time on the basis of the ascertained lateral distance values, correlating the geometrical driving axis to the center of the vehicle axle at the measurement time and determining an axially centric geometrical driving axis, and aligning the (Continued)

calibration device in correspondence to the ascertained axially centric geometrical driving axis.

12 Claims, 2 Drawing Sheets

(51) Int. Cl.
  G01S 7/497 (2006.01)
  G01S 17/08 (2006.01)
  H04N 17/00 (2006.01)
(52) U.S. Cl.
  CPC ............ G06T 7/80 (2017.01); H04N 17/002 (2013.01); *G06T 2207/30252* (2013.01)

(56) References Cited

U.S. PATENT DOCUMENTS

| | | | |
|---|---|---|---|
| 2008/0046220 A1* | 2/2008 | Fudala | G05D 1/0272 702/189 |
| 2010/0168957 A1* | 7/2010 | Takahashi | G01S 17/931 701/29.2 |
| 2010/0238291 A1* | 9/2010 | Pavlov | G06T 7/73 348/148 |
| 2014/0085428 A1* | 3/2014 | Stahlin | G08G 1/163 348/46 |
| 2018/0364403 A1* | 12/2018 | Sharma | B60R 13/105 |
| 2019/0122378 A1* | 4/2019 | Aswin | G06T 5/003 |
| 2020/0082185 A1* | 3/2020 | Yamamoto | G06V 20/58 |
| 2020/0096604 A1* | 3/2020 | Okubo | G01B 11/272 |
| 2020/0215865 A1* | 7/2020 | Sirault | A01B 79/005 |
| 2021/0188252 A1* | 6/2021 | Lu | B60W 40/12 |
| 2021/0213935 A1* | 7/2021 | Lu | B60W 10/18 |

FOREIGN PATENT DOCUMENTS

| | | |
|---|---|---|
| EP | 2233365 A2 | 9/2010 |
| WO | WO2019218098 * | 5/2018 |
| WO | 2018153723 A1 | 8/2018 |

* cited by examiner

METHOD AND DEVICE FOR ALIGNING A CALIBRATION DEVICE

FIELD

The present invention relates to a method and to a device for aligning a calibration device for calibrating vehicle environmental sensors.

BACKGROUND INFORMATION

Vehicle environmental sensors have come into frequent use for vehicles in order to determine for example distances, speeds of other vehicles, the state of the roadway, or traffic signs. In order to obtain accurate values from the vehicle environmental sensors, these sensors must be calibrated before use, using a calibration device.

German Patent Application No. DE 199 41 034 A1 describes a setting device having a setting unit for headlights or for a distance sensor of a vehicle, and having an optical adjusting device for aligning the setting unit relative to the vehicle. By recording features situated on the vehicle, during travel the axial direction of travel can be calculated at different times according to trigonometric relations. Here, two cameras are used that are connected to one another in mechanically stable fashion, and the connection has to be calibrated. In addition, a return-beam or projection screen is used to align the headlight or the distance sensor.

Vehicle environmental sensors, such as front cameras of a vehicle, can have a relation to the vehicle coordinate system of the vehicle manufacturer that is taken into account in order to calibrate these vehicle environmental sensors. Generally, the reference point is situated in the center of a vehicle axle. For these vehicle environmental sensors, a calibration device must be placed in front of the vehicle in such a way that its vertical center line, or a defined feature on the calibration device, is intersected by the geometrical driving axis of the vehicle, and the geometrical driving axis has its reference point in the center of a vehicle axle.

An object of the present invention is to provide a method with which a calibration device for calibrating a vehicle environmental sensor can be aligned with a high degree of accuracy with reference to the center of a vehicle axle. In addition, an object of the present invention is to provide a device for carrying out such a method.

SUMMARY

The object may be achieved by a method for aligning a calibration device in accordance with an example embodiment of the present invention. A device for carrying out the method is provided according to the present invention. Advantageous developments and embodiments of the present invention are described herein.

A method according to an example embodiment of the present invention for aligning a calibration device for calibrating a vehicle environmental sensor includes the steps of: measuring a temporal curve of at least one measurement point using the camera, determining the geometrical driving axis from the temporal curve of the at least one measurement point, measuring a first and a second lateral distance value of the vehicle using the distance sensors at a measurement time, determining a center of a vehicle axle at the measurement time on the basis of the ascertained lateral distance values, correlating the geometrical driving axis to the center of the vehicle axle at the measurement time and determining an axially centric geometrical driving axis, and aligning the calibration device in correspondence with the ascertained axially centric geometrical driving axis.

In the sense of the present invention, a temporal curve is understood as a measurement at a plurality of time points. In this way, for example for the measurement point, from the multiplicity of measurements a movement pattern during the overall time of the measurement can be created. For this movement pattern, the corresponding geometrical driving axis can then be determined. Here, the lateral distance values indicate a distance from the distance sensor to the vehicle that is measured essentially orthogonal to a vehicle longitudinal axis.

Here, the measurement time is understood as a previously defined time or a time at which the distance sensors register a change in distance. In the correlation of the ascertained geometrical driving axis with the center of a vehicle axle, the measurements are put into relation in such a way that the ascertained geometrical driving axis and the center of the vehicle axle are present at the same measurement time.

The method according to an example embodiment of the present invention may have the advantage that, in a simple manner and due to the high accuracy of the ascertaining of the center of a vehicle axle, the calibration device can be aligned relative to the center of the vehicle axle. In this way, the vehicle environmental sensor can be calibrated in relation to the center of the vehicle axle. Such an alignment generally requires only one camera and two distance sensors. As a result, the method can be carried out at low cost and without a large outlay.

In a preferred example embodiment of the present invention, an artificially positioned feature is used as measurement point. In the sense of the present invention, an artificial feature is a feature that is attached at a suitable location for the measurement. Such a feature has the advantage that it is easily detectable for the measurement and can be attached at a position that is advantageous for the measurement.

In a further preferred example embodiment of the present invention, a retroreflective measurement mark is used as feature. A retroreflective feature is particularly advantageously measurable through a return radiation of light coming from the direction of the camera.

Preferably, a natural feature of the vehicle is used as measurement point. In the sense of the present invention, a natural feature is a feature that is already present, for example due to the design of the vehicle, damage to the vehicle, or soiling of the vehicle. In this way, no additional feature has to be attached and then removed after the measurement. This saves time for the measurement.

In a preferred development of the present invention, the measurement of the lateral distance values is synchronized with the measurement frequency of the camera. In a synchronization, in each case the lateral distance values are measured and an image is recorded by the camera at the same time. Based on an assignment of the measurements to, for example, a system time, in each case the lateral distance values and the recorded image can be used at the same time. A correlation of the two measurements is substantially simplified in this way. In addition, a high degree of accuracy of the measurement is achieved.

Advantageously, a reference point of the geometrical driving axis and/or the center of the vehicle axle are ascertained at the measurement time by a linear interpolation. This means that the time of the measurement of the lateral distance values does not agree with the time of the recording by the camera. For example, the measurement of the lateral distance values is between two recordings by the camera. In order to ascertain the reference point of the geometrical driving axis at the time of the measurement of the lateral distance values, an algorithm is used to carry out a linear interpolation on the basis of the two recordings around the measurement of the lateral distance values. In this way, the reference point of the geometrical driving axis can be ascertained at the time of the measurement of the lateral distance values.

An advantage here is that a synchronization of the camera recordings with the measurement of the lateral distance values is not required. This simplifies the method, so that it can be carried out at lower cost.

In a further advantageous example embodiment, the distance sensors are aligned at the same height over the roadway. In this way, a lateral distance to a corresponding vehicle part, provided at the same height at both sides of the vehicle, can be detected. This enables an exact determination of the center of the vehicle axle. Particularly preferably, here the lateral distance values parallel to the roadway are determined. This means that a height of the distance sensor above the roadway agrees with a height above the roadway at which the lateral distance value at the vehicle is measured. This increases the accuracy of the measurement.

In a preferred example embodiment, the distance sensors measure a distance from one another before and/or after the measurement time, and the measured distances are compared with one another. In this way, the results can be compared with one another, so that, given a different result, a distance sensor that is measuring incorrectly can be identified and exchanged. It is also possible to calculate out the difference given knowledge of the exact distance. This increases the accuracy of the measurement.

Preferably, at least one lateral distance value is measured using a laser distance measuring device. A laser distance measuring device has a high degree of accuracy. In addition, a point to be measured can be set precisely. This can further increase the accuracy.

In a further preferred example embodiment, the measured distance of the distance sensors from a corresponding wheel of the vehicle is used as lateral distance value. Here, the wheel is fastened on the axle of which the center is to be determined. In this context, the axle is preferably the rear axle of the vehicle. The relation to the axle at which the center of the vehicle axle is to be determined is thereby greatest. In this way, the accuracy of the determination of the center of the vehicle axle can be further increased.

In addition, the object of the present invention may be achieved by a device for carrying out the method according to the present invention. In accordance with an example embodiment of the present invention, the device has a camera for acquiring a temporal curve of at least one measurement point, a first and a second distance sensor for acquiring lateral distance values of the vehicle, an evaluating device for determining a geometrical driving axis, a center of a vehicle axle and an axially centric geometrical driving axis, and a calibration device for calibrating the vehicle environmental sensor.

With such a device for carrying out the method according to the present invention, the advantages mentioned above in relation to the method can be achieved.

Exemplary embodiments of the present invention are shown in the figures and are explained in more detail in the description below.

DETAILED DESCRIPTION OF EXAMPLE EMBODIMENTS

Figure 1:
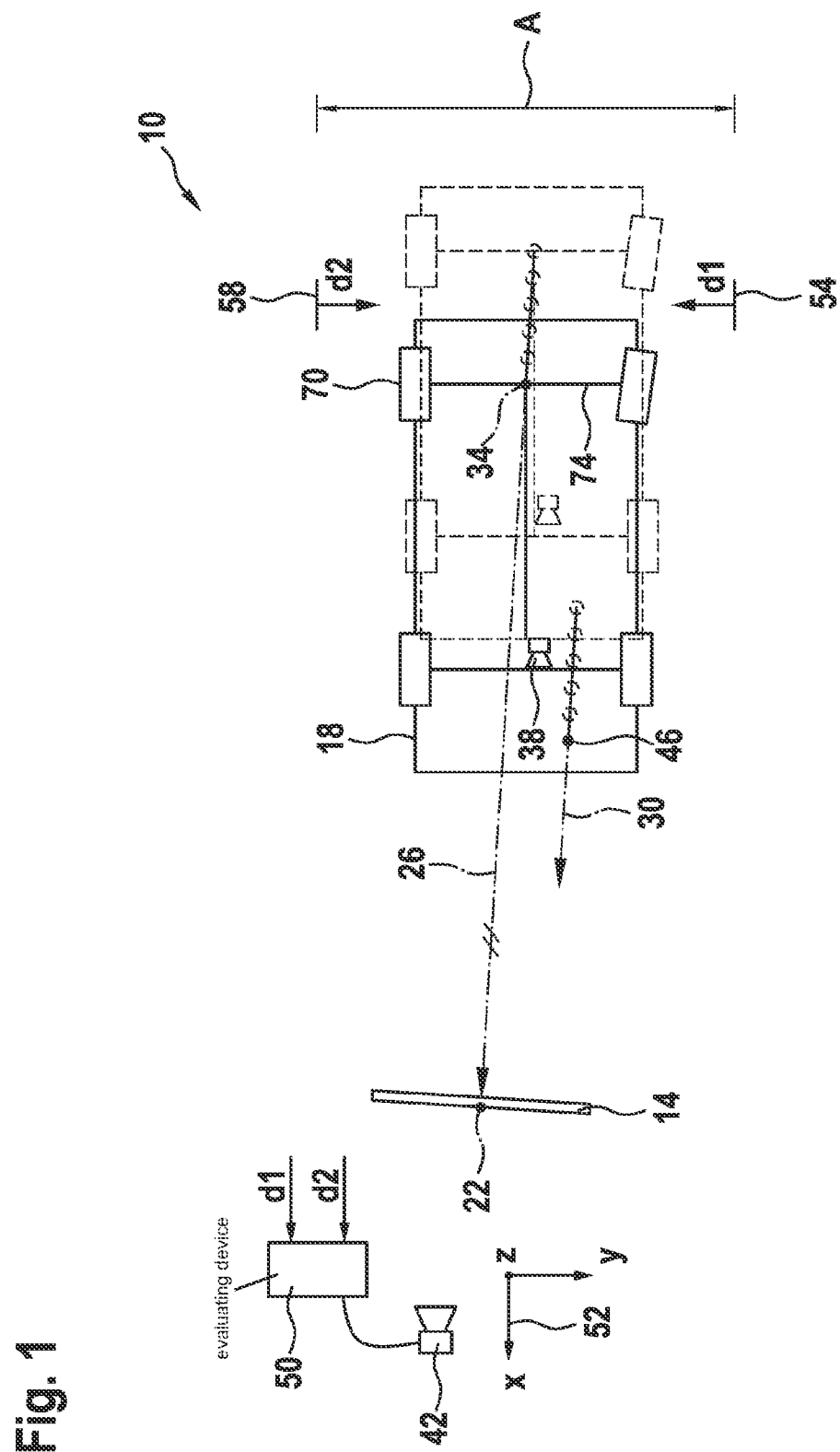
FIG. 1 shows a plan view of an exemplary embodiment of a device for carrying out the method according to the present invention for aligning a calibration device.

FIG. 1 shows a plan view of an exemplary embodiment of a device 10 for carrying out the method according to the present invention for aligning a calibration device 14. The goal of the method is to position calibration device 14 in front of a vehicle 18 in such a way that a vertical center axis 22, or a defined feature (not shown) of an axially centric geometrical driving axis 26, is intersected. Axially centric geometrical driving axis 26 here corresponds to a geometrical driving axis 30 that has its reference point in a center 34 of a vehicle axle, so that the axially centric geometrical driving axis 26 and geometrical driving axis 30 are parallel to one another. A vehicle environmental sensor 38 of vehicle 18 cannot be calibrated until such a configuration is present.

In order to determine the axially centric geometrical driving axis 26, device 10 has a camera 42 that is positioned in front of vehicle 18. This camera 42 acquires a temporal curve of a measurement point 46 that, in the depicted exemplary embodiment, is a feature artificially situated on vehicle 18. On the basis of the temporal curve of measurement point 46, an evaluating device 50 ascertains geometrical driving axis 30 of vehicle 18. The position and alignment of camera 42 in a measurement station system 52 are known to evaluating device 50.

In addition, the device has a first and a second distance sensor 54, 58. These distance sensors 54, 58 are situated opposite to one another, at a distance A, and, when vehicle 18 drives by, correspondingly measure a first and a second lateral distance value d1, d2 that indicate a distance from vehicle 18 lateral to the direction of travel. The position and orientation of distance sensors 54, 58 in measurement station system 52 are known to evaluating device 50.

These lateral distance values d1, d2 are subsequently communicated to evaluating device 50, so that evaluating device 50 can determine the center 34 of the vehicle axle from these values. The ascertained geometrical driving axis 30 and center 34 of the vehicle axle are subsequently correlated to one another in evaluating device 50, so that the axially centric geometrical driving axis 26 becomes capable of being determined. Corresponding to the determined axially centric geometrical driving axis 26, in a next step calibration device 14 can be aligned.

Figure 2:
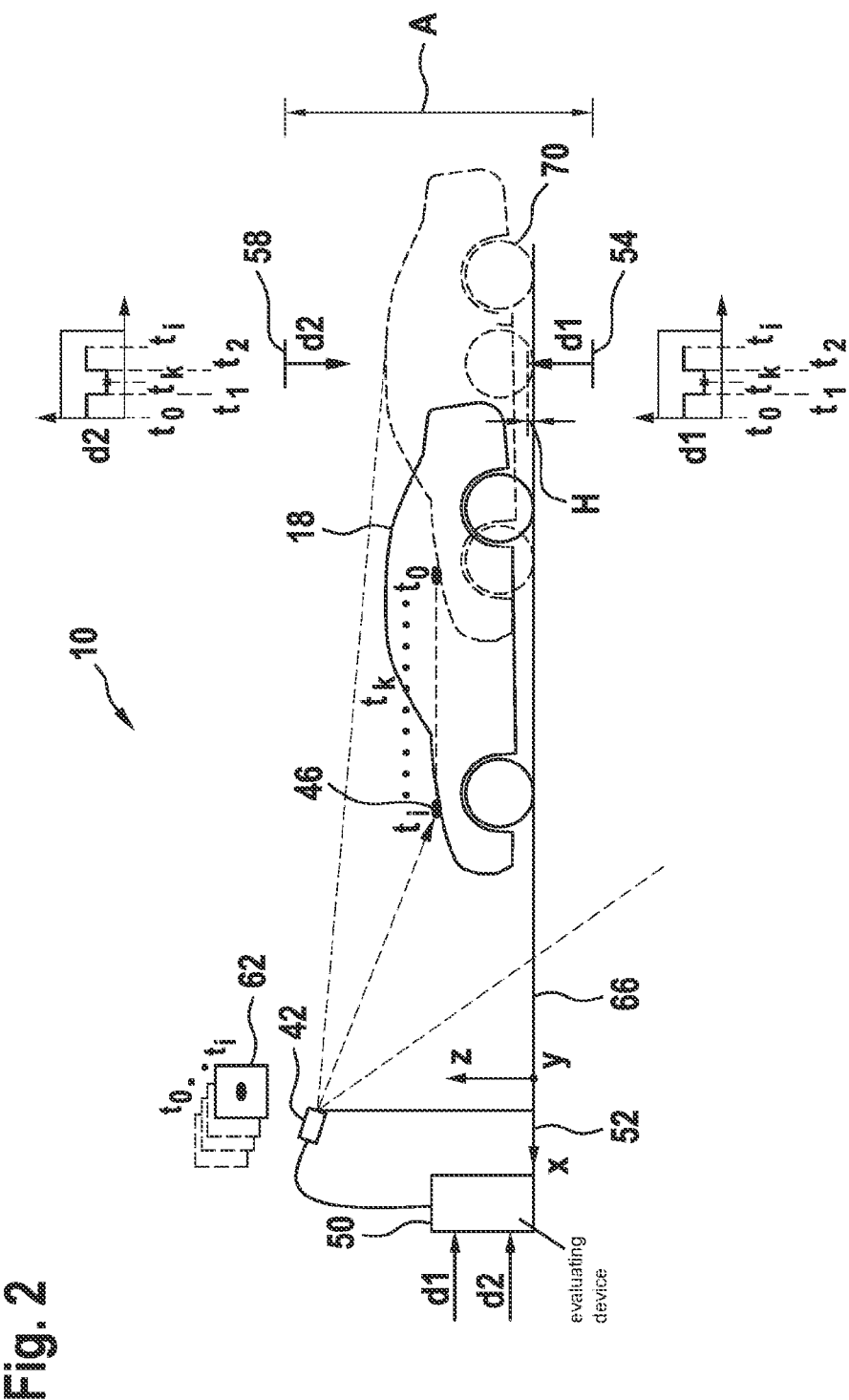
FIG. 2 shows a side view of the device of FIG. 1 for carrying out the method according to the present invention for aligning a calibration device.

FIG. 2 shows a side view of device 10 according to FIG. 1 for carrying out the method according to the present invention for aligning calibration device 14. FIG. 2 shows that camera 42 records, with a frequency of measurement, images 62 between a beginning of measurement $t_0$ and an end of measurement $t_i$. In the depicted exemplary embodiment, distance sensors 54, 58 measure the lateral distance values d1, d2, at the same height H parallel to a roadway 66, of measurement station system 52 for a respective wheel 70 traveling past, which in this case are wheels 70 of a rear axle 74 (see FIG. 1) of vehicle 18.

In the exemplary embodiment, the measurement frequencies of distance sensors 54, 58 are synchronized with the measurement frequency of camera 42. When wheels 70 move past, lateral distance values d1, d2 ascertained by distance sensors 54, 58 change. This is shown in the corresponding diagrams for distance sensors 54, 58.

Due to the change in distance, evaluating device 50 detects the moving past of the corresponding wheel 70. At a measurement time $t_k$, ascertained here as the center time between a first and last measurement value $t_1$, $t_2$ for the wheel, the corresponding image 62 of camera 42 is used and the reference point, corresponding to this image 62, of geometrical driving axis 30 is ascertained. Subsequently, geometrical driving axis 30 is correlated to the center 34 of the vehicle axle ascertained at measurement time $t_k$, so that axially centric geometrical driving axis 26 is ascertained.

On the basis of axially centric geometrical driving axis 26 ascertained at measurement time $t_k$, evaluating device 50 can determine axially centric geometrical driving axis 26 at a measurement end time $t_i$. Calibration device 14 can be aligned corresponding to this axially centric geometrical driving axis 26 ascertained at measurement end $t_i$ in order to calibrate vehicle environmental sensor 38 of vehicle 18.

What is claimed is:

1. A method for aligning a calibration device for calibrating a vehicle environmental sensor of a vehicle using a device that has a camera, a first distance sensor and a second distance sensor, the method comprising:
   measuring a temporal curve of at least one measurement point using the camera, wherein the temporal curve is a measurement at a plurality of time points, wherein from the measurements at the plurality of time points, a movement pattern during the overall time of the measurement is determined;
   determining a geometrical driving axis from the temporal curve of the at least one measurement point;
   measuring a first lateral distance value and a second lateral distance value of the vehicle using the first distance sensor and the second distance sensor at a measurement time;
   determining a center of a vehicle axle at the measurement time based on the ascertained first and second lateral distance values;
   correlating the geometrical driving axis to the center of the vehicle axle at the measurement time and determining an axially centric geometrical driving axis; and
   aligning the calibration device in correspondence to the ascertained axially centric geometrical driving axis.

2. The method as recited in claim 1, wherein an artificially situated feature is used as the at least one measurement point.

3. The method as recited in claim 2, wherein a retroreflective measurement mark is the feature.

4. The method as recited in claim 1, wherein a natural feature of the vehicle is used as the at least one measurement point.

5. The method as recited in claim 1, wherein the measurement of the first and second lateral distance values is synchronized with a measurement frequency of the camera.

6. The method as recited in claim 1, wherein a reference point of the geometrical driving axis and/or the center of the vehicle axle is ascertained at the measurement time through a linear interpolation.

7. The method as recited in claim 1, wherein the first and second distance sensors are oriented to a same height above a roadway.

8. The method as recited in claim 1, wherein the first and second lateral distance values are determined parallel to a roadway.

9. The method as recited in claim 1, wherein the first and second distance sensors each measure a distance from one another before and/or after the measurement time, and the measured distances are compared with one another.

10. The method as recited in claim 1, wherein at least one of the first and second lateral distance values is measured using a laser distance measuring unit.

11. The method as recited in claim 1, wherein a measured distance of each of the first and second distance sensors from a corresponding wheel of the vehicle are used as the first and second lateral distance values.

12. A device, comprising:
    a camera configured to acquire a temporal curve of at least one measurement point, wherein the temporal curve is a measurement at a plurality of time points, wherein from the measurements at the plurality of time points, a movement pattern during the overall time of the measurement is determined;
    a first distance sensor and a second distance sensor configured to acquire first and second lateral distance values of a vehicle;
    an evaluating device configured to determine a geometrical driving axis, a center of a vehicle axle, and an axially centric geometrical driving axis; and
    a calibration device configured to calibrate a vehicle environmental sensor.

\* \* \* \* \*